(12) United States Patent
Beck et al.

(10) Patent No.: US 7,422,199 B2
(45) Date of Patent: Sep. 9, 2008

(54) SELF-PUMPING HYDROPNEUMATIC SUSPENSION STRUT UNIT

(75) Inventors: Hubert Beck, Eitorf (DE); Werner Kuchheuser, Windeck-Stromberg (DE)

(73) Assignee: ZF Friedrichshafen AG, Friedrichshafen (DE)

(*) Notice: Subject to any disclaimer, the term of this patent is extended or adjusted under 35 U.S.C. 154(b) by 478 days.

(21) Appl. No.: 11/053,561

(22) Filed: Feb. 8, 2005

(65) Prior Publication Data

US 2005/0189186 A1    Sep. 1, 2005

(30) Foreign Application Priority Data

Feb. 26, 2004    (DE) ................. 10 2004 009 224

(51) Int. Cl.
*B60G 17/00*    (2006.01)
(52) U.S. Cl. ............... 267/64.17; 188/315; 188/322.14
(58) Field of Classification Search ......... 188/314–315, 188/322.19, 322.14, 322.16, 322.17; 267/64.17, 267/64.15, 64.26, 161–163
See application file for complete search history.

(56) References Cited

U.S. PATENT DOCUMENTS

| | | | | |
|---|---|---|---|---|
| 972,434 A | * | 10/1910 | Blomberg | 251/337 |
| 3,592,164 A | * | 7/1971 | Schultze | 188/242 |
| 4,502,672 A | * | 3/1985 | Meller et al. | 267/64.17 |
| 4,577,840 A | * | 3/1986 | Meller et al. | 267/64.17 |
| 5,797,594 A | * | 8/1998 | Sekine et al. | 267/64.17 |
| 5,826,862 A | * | 10/1998 | Beck | 267/64.17 |
| 5,826,863 A | * | 10/1998 | Beck | 267/64.17 |
| 5,857,665 A | * | 1/1999 | Beck | 267/64.17 |
| 5,988,655 A | * | 11/1999 | Sakai et al. | 280/6.159 |

FOREIGN PATENT DOCUMENTS

DE    33 18 939    11/1984

OTHER PUBLICATIONS

Wikipedia, the free encyclopedia, "Belleville washer", pp. 1-3.

* cited by examiner

*Primary Examiner*—Robert A. Siconolfi
*Assistant Examiner*—Vu Q Nguyen
(74) *Attorney, Agent, or Firm*—Cohen Pontani Lieberman & Pavane LLP

(57) ABSTRACT

Self-pumping hydropneumatic suspension strut unit with internal level control, with an oil-filled working cylinder subject to the pressure of gas cushions and with a damping piston, which is free to slide inside the cylinder and is mounted at the end of a hollow piston rod, the cavity of which serves as a pump cylinder for a pump rod attached to the working cylinder. Oil is drawn from a reservoir space when the piston rod travels outward, whereas the oil is conveyed into the working space when the piston rod travels inward. The pump rod passes through the end wall of the working space and is held axially in position by an end-mounted disk formed as a Belleville washer, which acts as a universal joint for the rod. The disk engages in a groove in the pump rod and is held in place by its outer circumference axially between the working cylinder and the end wall of the working cylinder. The disk has a slot to accept the pump rod, the first area of this slot having a diameter corresponding to the base of the groove, whereas the second area has a diameter corresponding to the outside diameter of the pump rod.

6 Claims, 5 Drawing Sheets

SELF-PUMPING HYDROPNEUMATIC SUSPENSION STRUT UNIT

BACKGROUND OF THE INVENTION

1. Field of the Invention

The invention pertains to a self-pumping hydropneumatic suspension strut unit with internal level control, with an oil-filled working cylinder subject to the pressure of gas cushions and with a damping piston, which is free to slide inside the cylinder and is mounted at the end of a hollow piston rod, the cavity of which serves as a pump cylinder for a pump rod attached to the working cylinder. Oil is drawn from a reservoir space when the piston rod travels outward, whereas the oil is conveyed into the working space when the piston rod travels inward. The pump rod passes through the end wall of the working space and is held axially in position by an end-mounted disk, which acts as a universal joint for the rod. The disk engages in a groove in the pump rod and is held in place by its outer circumference axially between the working cylinder and the end wall of the working cylinder.

2. Description of the Related Art

Self-pumping hydropneumatic suspension strut units with internal level control according to the introductory clause are already known (e.g., DE 33 18 939 C2). The pump rod has here a circumferential groove, and a slotted disk engages in this groove to hold the pump rod in place with respect to the working space. The pretensioning force of the working cylinder exerts a clamping force, which fixes the pump rod axially in place. During operation of a suspension strut unit of this type, it has been found that changes in the overall length of the unit occur as a result of fluctuations in temperature and pressure. As a result of such changes, the working cylinder can lose its pretensioning force, and the slotted disk, because of the lack of elasticity of the associated components, can work itself loose. The disadvantage here is not only that noise can develop but also that, under certain conditions, a decrease in the damping pressure can occur in the suspension spring strut unit.

SUMMARY OF THE INVENTION

An object of the invention is to create a simple and low-cost pump rod attachment, which is short in order to ensure optimal utilization of the stroke of the rod and which at the same time keeps the pump rod and the working cylinder under pretension regardless of the operating conditions.

According to the invention, the disk has a slot to accept the pump rod, the first area of this slot having a diameter corresponding to the base of the groove, whereas the second area has a diameter corresponding to the outside diameter of the pump rod.

The advantage here is that only a single component is required, namely, the disk, and after the simple assembly and introduction of the components into the working cylinder, the pump rod is nevertheless centered and held captive.

In accordance with an essential characteristic, the first area of the disk is aligned with the center axis of the working cylinder.

A favorable embodiment provides that the thickness of the bottom area of the disk is the same as the width of the groove.

To obtain the appropriate pretension by way of the disk, it is provided in accordance with an embodiment which is advantageous with respect to production technology that the edge area of the disk proceeds at an angle.

An essential embodiment provides that a disk spring is used as the disk.

According to another embodiment, it is provided that openings are provided in the edge area, which communicate with pass-through openings in the end wall.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
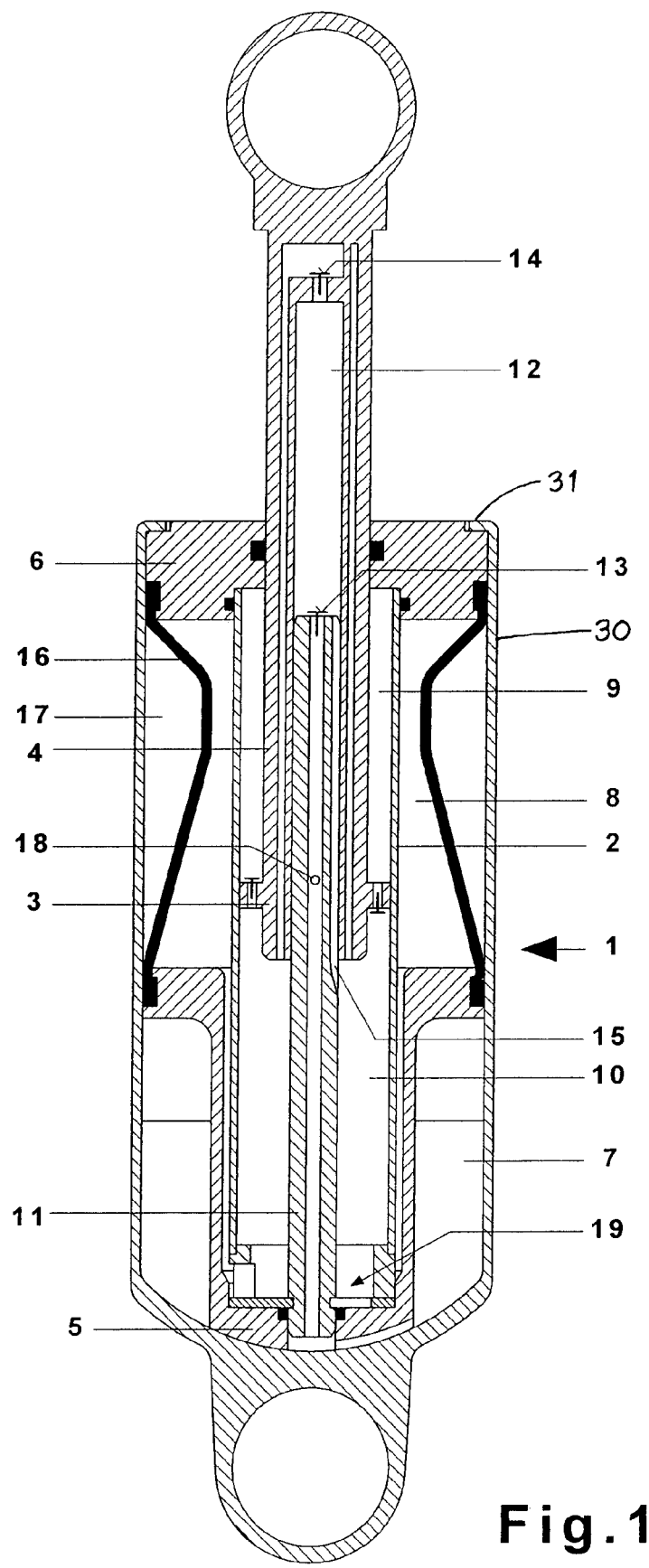
FIG. 1 shows a cross section of a self-pumping hydropneumatic spring strut unit with internal level control.

The self-pumping hydropneumatic suspension strut unit 1 for motor vehicles shown in FIG. 1 consists essentially of the working cylinder 2, in which a damping piston 3, mounted at the end of a hollow piston rod 4, slides. The working cylinder 2 is closed off at one end by an end wall 5 and at the other end by the rod guide 6, through which the hollow piston rod 4 extends to the outside with the help of a seal. By way of the end wall 5, the spring strut unit is attached by means of a fastening eye to the body of the vehicle, and at the lower end of the spring strut unit, the piston rod 4 is attached by means of another mounting eye to the axle of the vehicle in a manner not shown. The working cylinder 2 is surrounded by a ring-shaped, partially oil-filled, partially gas-filled compensating chamber, which is divided by an intermediate wall into a high-pressure chamber 8 and a low-pressure chamber 7. A high-pressure gas cushion 17 in the high-pressure chamber 8 is separated from an oil space by a partition wall 16. In the low-pressure chamber 7, oil and a low-pressure gas cushion are not separated from each other. In the completely deregulated state, that is, when not pumped up, the same pressure is present in both the low-pressure chamber 7 and in the high-pressure chamber 8. The compensating chamber is surrounded by an outer tube 30 formed radially inward with a flange 31 to retain the rod guide 6 and the working cylinder 2 in the assembled position.

The low-pressure chamber 7 and the high-pressure chamber 8 are connected to the working cylinder 2. The working cylinder 2 is divided by the damping piston 3 into two working spaces 9 and 10; the damping piston 3 has damping valves for the pull stage and damping valves for the push stage.

The actual level control of the self-pumping hydropneumatic suspension strut unit is accomplished by way of the pump rod 11, which, together with the hollow space inside the piston rod 4, forms a pump 12. The relative movement which occurs between the pump rod 11 and the piston rod 4 during the operation of the vehicle causes damping medium to be conveyed from the low-pressure chamber 7, through an inlet valve 13 and an outlet valve 14, into the working spaces 10 and 9. The damping piston 3 moves outwards until the bypass 15 produces a connection between the chamber of the pump 12 and the lower working space 10.

At this point, the pumping action of the pump 12 is stopped, and the dynamic level control of the vehicle begins. When the load on the vehicle is removed, the damping piston 3 is first pushed further outward by the gas pretension in the high-pressure chamber 8 until, via the now-open deregulation bore 18, the pressure inside the suspension strut unit is equalized, after which the piston rod 4 with the damping piston 3 is pushed inward.

The pump rod attachment 19 is described in detail in the following figures.

Figure 1A:
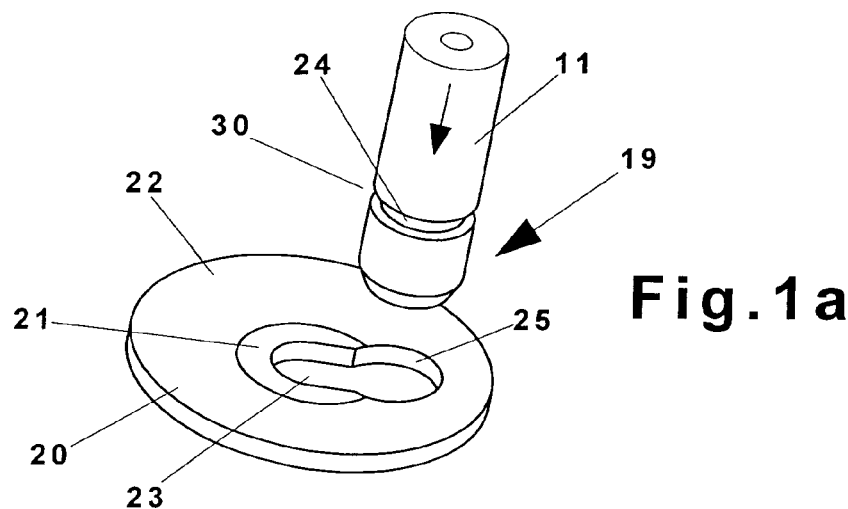
FIGS. 1a-1d show various views of details of a pump rod and a disk.

FIG. 1a shows a pump rod attachment 19 before it has been assembled, where the disk 20 consists of a bottom area 21 and a wall area 22, which proceeds from the bottom area at an angle. A slot 23 proceeds from the center of the disk 20; this slot is slightly larger than the diameter of base 24 of the groove 30 in the pump rod 11. The slot 23 leads to an off-center opening 25, the inside diameter of which is slightly larger than the outside diameter of the pump rod 11.

To install the pump rod 11 in the disk 20, the pump rod 11 is first pushed through the off-center opening 25 in the disk 20 until the base 24 of the groove 30 in the pump rod 11 is even with the bottom area 21 of the disk 20.

Figure 1B:
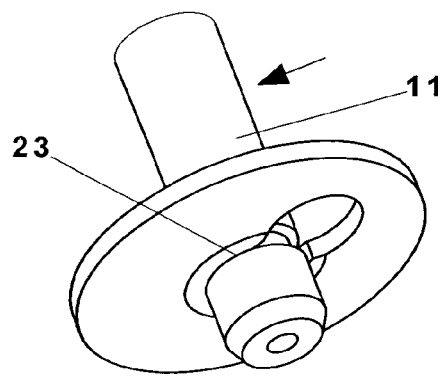
Figure 1C:
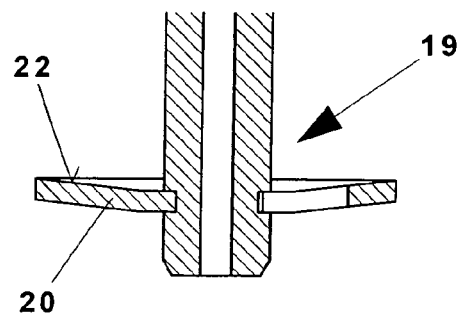

The end position of the pump rod 11 after it has been shifted horizontally into the slot 23 is illustrated in FIG. 1b. The associated FIG. 1c shows the pump rod attachment 19 in cross section. The angled edge area 22 of the disk 20 is oriented upward.

Figure 1D:
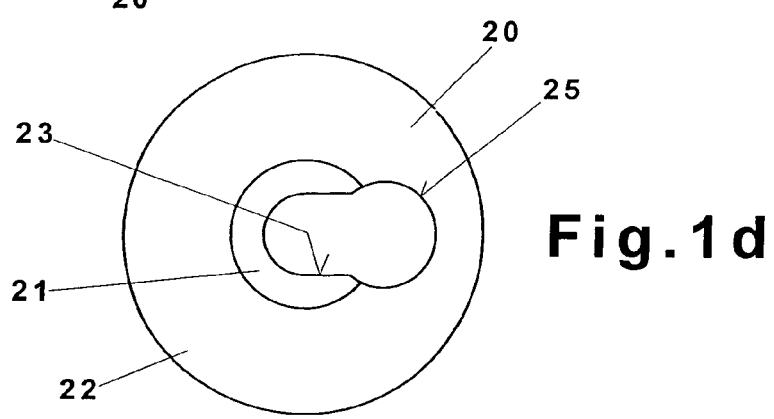

FIG. 1d shows a top view of the disk 20 with its slot 23, the bottom area 21, the angled area 22, and the off-center opening 25.

Figure 1E:
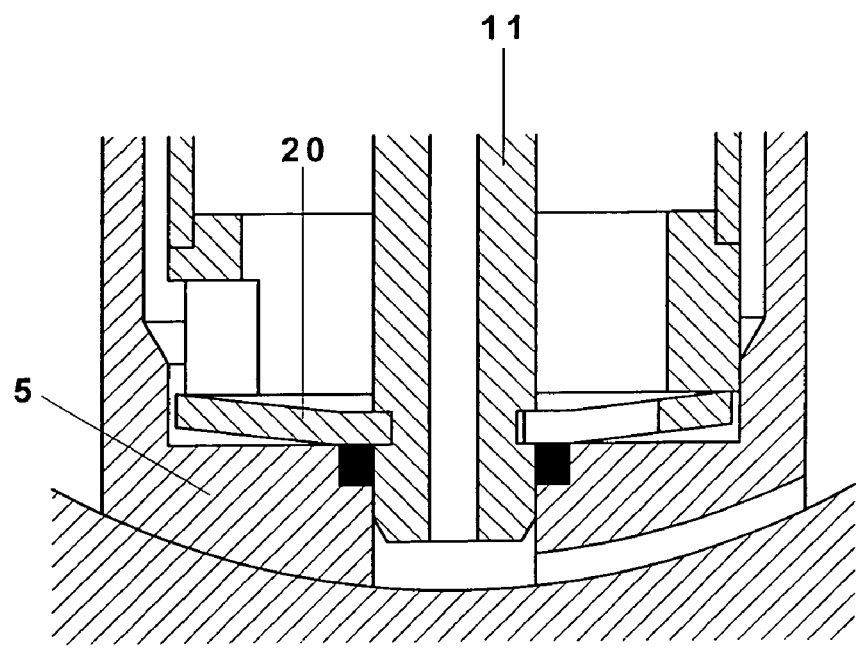
FIGS. 1e-1f show the embodiment illustrated in FIGS. 1a-1d in the assembled state.
Figure 1F:
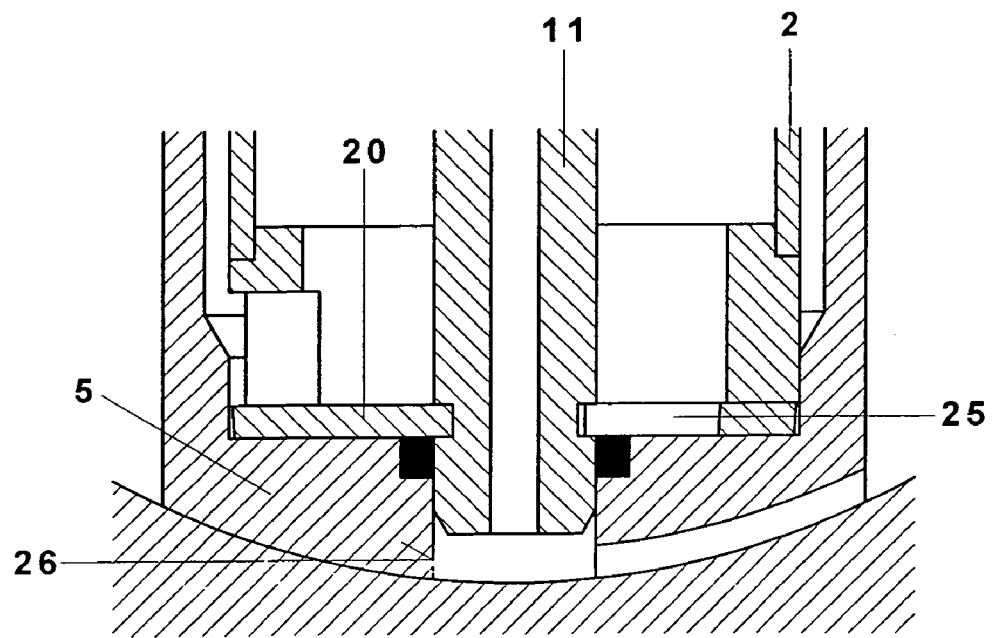

The installation of the pump rod 11 together with the disk 20 into the end wall 5 is illustrated in chronological order in FIGS. 1e and 1f. First, as shown in FIG. 1e, the pump rod 11 is introduced into the end wall 5; here the disk 20 can be seen in its original (unloaded) form. The disk is formed as a Belleville washer having a flat central portion and a surrounding conical portion extending to the circumference when the disk is in an unloaded condition. After the unit has been sealed as shown FIG. 1f, the circumference of disk 20 is pushed by the pretension of the working cylinder 2 against the end wall 5; the bore 26 in the end wall 5 centers the pump rod 11 in the radial direction. The pump rod 11 is thus held captive with respect to the disk 20, because it is no longer possible for it to escape into the off-center opening 25. In the loaded or pretensioned condition, the disk 20 is flat, the working cylinder being held in place by the flange 31 formed over the rod guide 6.

Figure 2:
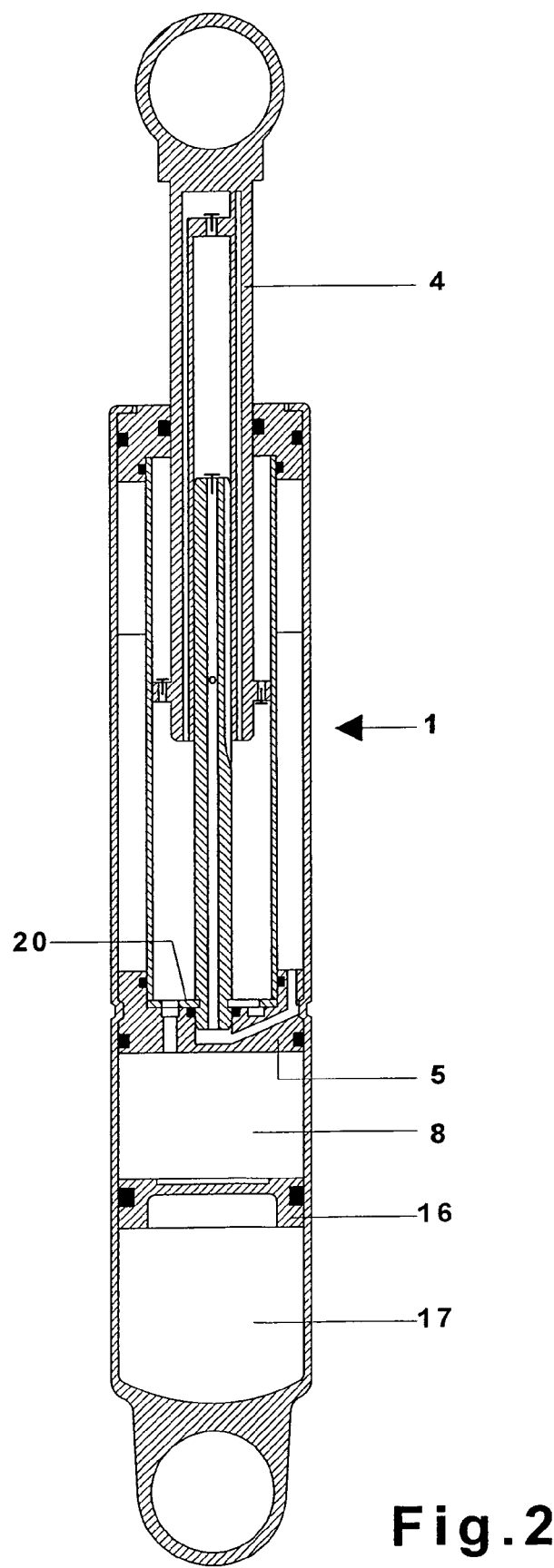
FIG. 2 shows another embodiment of a self-pumping hydropneumatic spring strut unit, where the flow connection from the working space to a compensating space passes through the disk.

The self-pumping, hydropneumatic spring strut unit 1 with internal level control shown in FIG. 2 represents an extra-length version. The high-pressure chamber 8 in this design is located below the end wall 5, and an axially sliding partition wall 16 separates the gas cushion 17 from the damping medium in the high-pressure chamber 8. The inward and outward travel of the piston rod 4 causes the displaced oil to move through the disk 20 and the end wall 5.

Figure 2A:
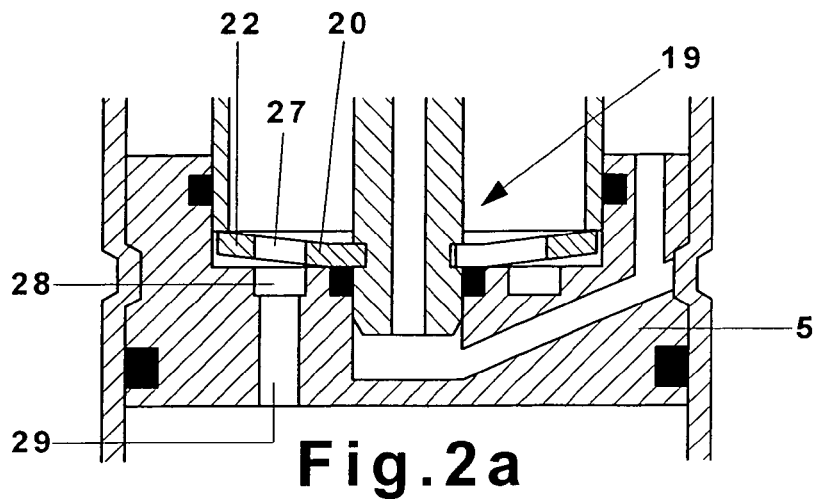
FIG. 2a is an enlarged cross section showing a detail of the strut unit prior to sealing.
Figure 2B:
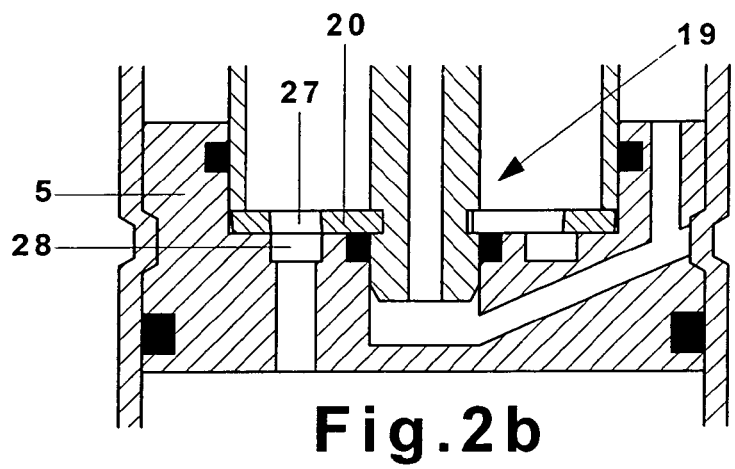
FIG. 2b shows a detail of the strut unit after sealing.

FIG. 2a shows the pump rod attachment 19 just before the spring strut unit is sealed. The angled edge area 22 of the disk 20 here has several openings 27 distributed around the circumference. These openings 27 communicate with a circumferential groove 28 and the adjacent pass-through openings 29 in the end wall 5.

After the suspension strut unit has been sealed, the pump rod attachment 19 (already shown in principle in FIG. 1f), is clamped in place. The presence of the circumferential groove 28 in the end wall 5 means that the disk 20 can be installed in any rotational position, because the openings 27 are in flow connection with the circumferential groove 28.

Figure 2C:
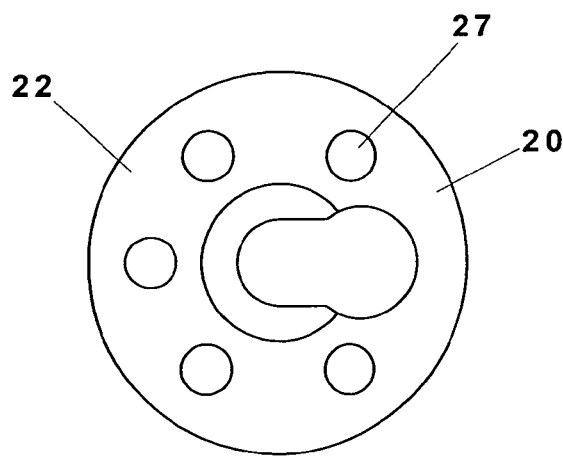
FIG. 2c is a plan view of the disk.

FIG. 2c shows a top view of the disk 20 as an individual part. The openings 27 are located here in the angled edge area 22. This type of disk 20 with corresponding openings 27, however, can also be easily used in the version illustrated in FIG. 1, which means that the standard parts can be used for both.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A self-pumping hydropneumatic suspension strut unit with internal level control, the suspension strut unit comprising:
    an oil filled working cylinder having an end which is closed by an end wall and another end which is fitted with a rod guide;
    a damping piston which is free to slide in the working cylinder, the piston being connected to a hollow piston rod extending from the rod guide;
    a pump rod extending into the hollow piston rod to form a pump cylinder, the pump rod having an end received in the end wall and a circumferential groove proximate to the end, the groove having a width and a bottom with a diameter; and
    a disk having an outer circumference which is held between the working cylinder and the end wall, and a slot which receives the pump rod, the slot having a first portion with a diameter which corresponds to the diameter of the bottom of the groove and a second portion with a diameter which corresponds to the outside diameter of the pump rod, the disk being formed as a Belleville washer having a conical shape in an unloaded condition, the disk being pressed into a loaded condition by the working cylinder bearing against the outer circumference,
    wherein the disk has a flat central portion and a surrounding portion which extends conically from the central portion to the circumference when the disk is in an unloaded condition, the surrounding portion being pressed flat when the disk is in a loaded condition.

2. The suspension strut unit of claim 1 wherein the first portion of the slot is aligned with the axis of the working cylinder.

3. The suspension strut unit of claim 1 wherein the disk has a thickness adjacent to said first portion of said slot which is the same as the width of the groove.

4. The suspension strut unit of claim 1 wherein the end wall comprises at least one opening which communicates with a pressure chamber loaded by a gas cushion, the surrounding portion of the disk having through openings which communicate with the at least one opening in the end wall.

5. The suspension strut unit of claim 4 wherein said end wall has a circular groove which communicates with said at least one opening in said end wall.

6. The suspension strut unit of claim 1 further comprising an outer tube surrounding the working cylinder to form a compensating space, the outer tube being formed radially inward with a flange to retain the rod guide in the outer tube, the rod guide bearing against the working cylinder to hold the disk in the loaded condition.

* * * * *